Oct. 11, 1960

M. I. HOFFMAN ET AL 2,955,649

ULLAGE COMPENSATORS FOR PRESSURIZING SYSTEMS

Filed March 26, 1954

INVENTORS.
MARK I. HOFFMAN
BY ERNEST A. ATILANO

ATTORNEY

INVENTORS.
MARK I. HOFFMAN
BY ERNEST A. ATILANO

ATTORNEY

Oct. 11, 1960     M. I. HOFFMAN ET AL     2,955,649
ULLAGE COMPENSATORS FOR PRESSURIZING SYSTEMS
Filed March 26, 1954                      3 Sheets-Sheet 3

INVENTORS.
MARK I. HOFFMAN
BY ERNEST A. ATILANO

*William P. Lane*

ATTORNEY

United States Patent Office 2,955,649
Patented Oct. 11, 1960

2,955,649
ULLAGE COMPENSATORS FOR PRESSURIZING SYSTEMS

Mark I. Hoffman, Whittier, and Ernest A. Atilano, Long Beach, Calif., assignors to North American Aviation, Inc.

Filed Mar. 26, 1954, Ser. No. 418,846

13 Claims. (Cl. 158—50.1)

This invention is directed to various forms of ullage compensators for use in pressurizing systems. The word "ullage" is used to describe the free space above the surface of the liquid contained in a tank.

A particular problem arises in obtaining rapid delivery of any liquid in a tank by pressurization where a free space is present in the tank. This problem is particularly acute when the tank must be pressurized rapidly at various temperatures. When such tank or container is subjected to operating conditions over various temperature ranges the liquid or fluid in the tank contracts and expands as the temperature decreases or increases, thus giving various amounts of ullage in the tank.

In order to rapidly increase delivery pressure to a predetermined value it is desired that all, or the major part, of the pressurizing medium act directly on the liquid. If it is necessary that the pressurizing medium first act to pressurize the ullage it is impossible to rapidly increase the delivery pressure to a predetermined value.

This problem is particularly important in the designing of rocket power plants in which propellants are supplied by a pressurized feed system, as distinguished from a system in which the propellants are pumped to the combustion chamber. It is necessary that the propellant tanks be rapidly pressurized at the start of the firing sequence. The action of the pressurization tends to expel the liquid from the propellant tanks. The volume of liquid expelled from the tanks opens burst diaphragms, or other normally closed valves, and instantly initiates combustion after being injected into the combustion chamber. All of this preliminary pressurization must be accomplished rapidly over a wide range of temperatures. These temperatures will vary from —65° F. to 160° F. Use of the instant invention is contemplated both within and without this range. The previous methods and apparatus utilized in tank pressurization do not allow for pressurization at the rapidity contemplated by the instant invention. The variation in tank volume of certain propellants over a temperature range of —65° F. to 160° F. becomes an extremely significant factor when it is realized that expansion space has to be provided in a storage system, since propellant containers must be confined volumes. As a rule, the storage systems or propellant containers contain one of many oxidizers and one of many fuels. Spill-over of oxidizers and loss of any propellant cannot be permitted. As an example of this problem, a propellant with a residual temperature of —65° F., completely contained in a tank at some definite pressure, will expand as its temperature is raised to 160° F. Approximately twenty percent more volume will have to be provided in an ullage, or similar space, for the increased volume in order to maintain the original definite pressure in the storage system. In the field of rocketry it is necessary that a stated ratio of oxidizer and fuel be delivered at a prescribed pressure and during a certain small time interval to the combustion chamber in order to obtain constant rocket performance, measured as the time to a 1,000 yard target. With former pressurizing methods, the variable and increased time, due to the variable ullage space, required to pressurize each propellant up to the operating value is of sufficient magnitude to preclude meeting the operating requirements. In addition, certain rocket engines have less than rated propellent volume during operation on cold days because of the variable ullage condition, and subsequently produce less than rated thrust.

The primary object of this invention is to provide means to obtain rapid pressurization of a fluid in a tank.

A further object of this invention is to provide means to obtain rapid pressurization of the fluid in a propellent tank by isolating the ullage contained in the system.

A still further object of this invention is to provide means to completely isolate the ullage in a liquid-holding tank.

A particular object of this invention is to provide an ullage-compensating system having a movable tubular member slidable about a fixed member and adapted to compress or expand a gaseous medium between the tubular member and the fixed member.

A further object of this invention is to provide various types of locking means so that the moving cylinder may be locked with respect to the fixed member.

A still further object of this invention is to provide an ullage-compensating system in a liquid-holding tank wherein a certain pressure increase on said tank acts directly on the liquid contained in the tank.

An additional object of this invention is to incorporate various ullage compensating devices in rocket structure.

A particular object of this invention is to provide an ullage-compensating system in which the medium within the ullage system is prevented from coming in direct contact with the propellant.

A further object of this invention is to provide means to remove trapped air and vapors from the propellent feed and ullage systems and to provide means to eliminate vaporization of the propellants.

Other objects of invention will become apparent from the following description taken in connection with the accompanying drawings, in which Fig. 1 is a cross section of a rocket containing the present invention in one of its specific aspects;

The ullage present in a liquid-holding tank, by this invention, is controlled by a variable-volume cylinder associated with or immersed in the liquid-holding tank. This cylinder, or tubular member, is capable of sliding movement on a fixed member and includes a compressible gaseous medium between the tubular member and the fixed member. Thus, changes in volume of the liquid in the liquid-holding tank will move the cylinder with respect to the fixed member, compressing the gaseous medium and compensating for the change in ullage.

The invention is further concerned with providing a hand-operated or pressure-actuated lock to hold the variable-volume cylinder of the ullage-compensating unit in whatever position it happens to be when the firing sequence is about to begin, or is beginning. By reason of the combination of the variable-volume cylinder and the locking means, the pressurizing gas acts directly against a solid volume of propellant instead of first pressurizing the free space above the propellant in the tank or further moving the cylinder.

Figure 1:
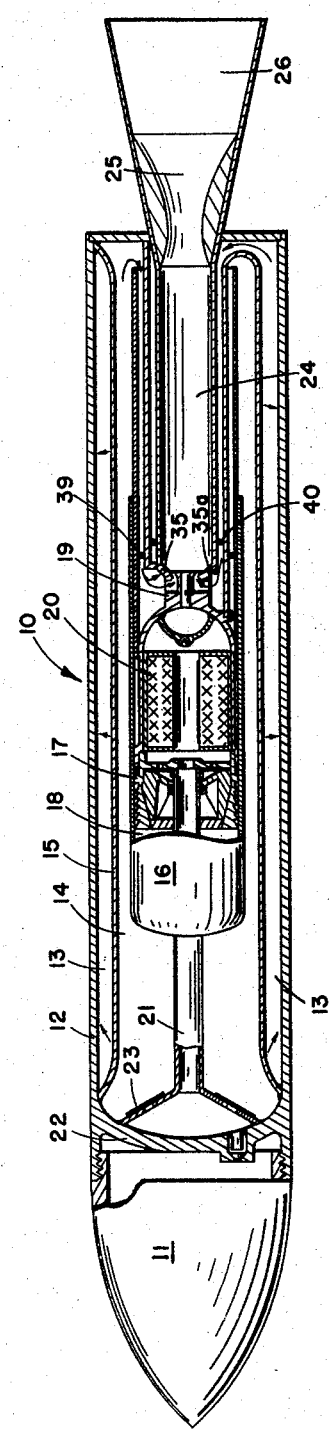

The invention in its over-all aspects is illustrated in Fig. 1. Fig. 1 shows a cross-sectional view of a rocket in which an ullage compensator is incorporated. The rocket 10 comprises a warhead 11, an ullage-compensating device 16 and 17, an exhaust tube 21, a longitudinal propellent tank 12 which, in the illustrated rocket, contains two distinct sections 13 and 14 separated by a flexible wall 15, an igniter or other pressurizing means 20, a fuel and oxidizer injector 19, a combustion chamber 24, a throat section 25, and an exhaust section 26. A gaseous medium, such as Freon or air, of a vapor pressure greater than the pressure in the propellent tanks, is situated in the space 18 between the members 16 and 17 of the ullage-compensating unit. Burstible or one-way valves 23 are situated at the forward end of the exhaust tube 21. It is to be understood that various fill ports and vapor vents are present in the rocket structure for filling the rocket with fuel, oxidizer and compressible gas.

In operation, the rocket 10 contains, for example, fuel in the inner portion 14 of the propellent tank surrounding the exhaust tube 21, while oxidizer is stored between the exterior rigid wall of the rocket and the flexible wall 15. In storage, the expansion and contraction of the fuel and oxidizer is compensated for by the presence of the ullage system 16 and 17. This ullage system is explained in detail below with reference to Fig. 2. When the igniter or other pressurizing medium is actuated, gases from the igniter 20 instantly or rapidly pressurize the propellent tanks by reason of the gases traveling along the exhaust tube 21 being deflected by the deflector 22, bursting the burstible diaphrams 23, forcing the liquid out of section 14, and moving the flexible wall 15 against the rigid wall 12 (shown by arrows in Fig. 1), thereby forcing the oxidizer out of the section 13 of the propellent tank. Since all of the ullage present in the propellent tanks is isolated in the ullage compartment 18, the exhaust gases of the igniter 20 rapidly pressurize the propellent tank and force the fuel and oxidizer into the injector. The hot gases from the igniter are also emitted in the opposite direction from the exhaust tube and create the necessary ignition for the injected fuel and oxidizer in the combustion chamber. The hot gases in the combustion chamber pass through the throat section 25 and exhaust section 26 to give the necessary thrust to the over-all rocket.

Figure 2:
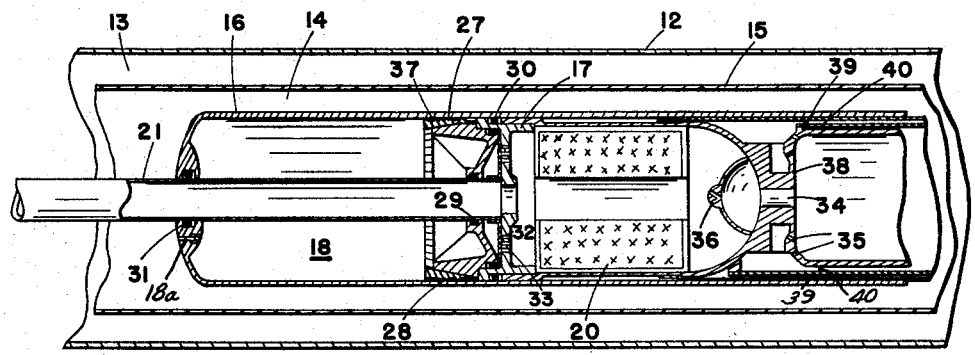
Fig. 2 shows a detailed cross section of the ullage-compensating device of Fig. 1.

The ullage compensating system 16 and 17 of Fig. 1 is illustrated in detail in Fig. 2. This ullage compensating assembly comprises a moving tubular member or cylinder 16 which moves with respect to a fixed member 17. A compressible medium is present in the volume between the closed end of the cylinder 16 and the fixed piston 17. The moving cylinder 16, further, is slidable on the exhaust tube 12. Suitable seals 29, 30, and 31 are provided. The propellent tank sections 13 and 14, separated by the flexible wall 15, are completely loaded with fuel and oxidizer. Any changes in volume of the oxidizer and fuel due to contraction and expansion will be compensated for by an equal but reverse expansion and contraction of the moving cylinder with respect to the fixed member 17. The moving cylinder and the ullage unit prevent vaporization of the propellant by keeping more than vapor pressure acting on the propellant. The ullage-compensating unit further comprises a means to lock the moving cylinder with respect to the fixed member. The locking means illustrated in Fig. 2 comprises an extension member 27 having serrations 37 exteriorly thereof, and a movable locking piston 28 having a wedged-shaped cross section. Operation of the locking means is as follows. The sudden pressure built up by the actuation of the igniter 20 passes through the apertures 32 and bursts the burst diaphragms 33, forcing the lock piston into wedging relationship with the extension 27 of the fixed member 17. The serrations 37 of the extension piece 27 are forced into contact with the interior surfaces of the cylinder 16, locking such cylinder with respect to the fixed member 17. The igniter is actuated by means of an electrically operated squib 34 which emits igniting gases through apertures 36 into the region containing the igniter 20.

It is to be understood that burstible diaphragms or one-way valves 39 and 40 are present in proximity to the aft end of the fuel tanks or the injector 38 to avoid premature flow of the fuel and the oxidizer into the injector or into the combustion chamber. Injector 38 has apertures 35 and 35a. The flow of propellant from section 14 through valve or burst diaphragm 39 and out apertures 35a is shown in Fig. 1. Flow from propellant section 13 through valve or burst diaphragm 40 and out apertures 35 is also shown therein.

The present invention provides an ullage-compensating unit having a high degree of efficiency and which does not entrap any of the propellants, provides complete isolation of ullage, and provides for rapid pressurization of the propellent tanks.

Figure 3:
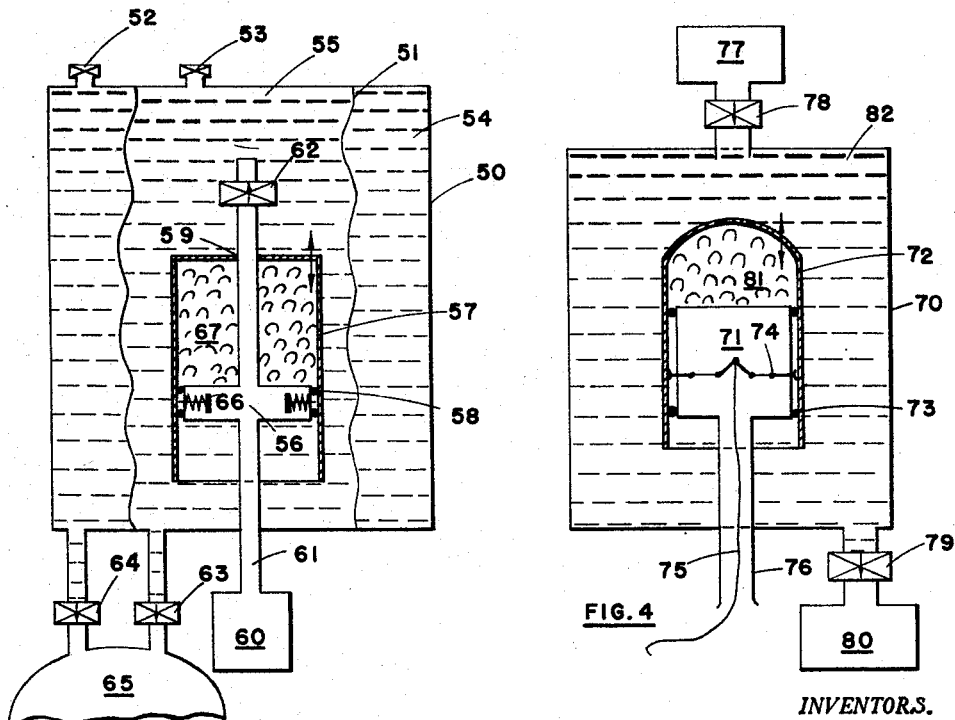
Fig. 3 shows a further means for effecting the rapid pressurization of a liquid in a container.

Fig. 3 illustrates a modification of the ullage-compensating system. The propellent tank 50 has a flexible wall 51 separating propellent sections 54 and 55. Measured amounts of oxidizer and fuel are loaded into the propellent tank via the filler openings 52 and 53 which can be of the two-way type or can be inlets only, with suitable provision for venting. Within the section 55 is placed a fixed piston member 56 and a movable tubular or cylindrical member 57 slidable on the fixed member 56. The cylindrical member 57 is also slidable over the exhaust tube 61. Suitable sealing means 58 and 59 are provided. The space 67 between the closed end of the cylinder 57 and the fixed member 56 is filled with Freon, air, or other compressible medium. After loading, and in pre-storage and pre-firing condition, the changes in volume of the liquids in the tank due to changes in ambient temperature are compensated for by changes in volume 67. Thus, the cylinder 57 moves with respect to the fixed piston member 56 to compensate for the ullage changes. At the start of the firing sequence, the pressurizing means 60 (an igniter or self-contained pressurizing system) emits high pressure gases into the exhaust tube 61. These high pressure gases simultaneously actuate the locking means 66 to lock the moving cylinder with respect to the fixed piston member and break the burstible diaphragm 62 (or other one-way valve means) to pressurize the liquid or liquids in the fuel tank or tanks. In the illustrated figure, the liquid in the tank section 55 breaks the diaphragm 63 upon pressurization. The liquid within the tank 55 is thus emitted into injector 65. At the same time, the flexible wall 51 is forced out against the rigid wall 50 and forces the fluid within the section 54 through the burstible diaphragm 64 into the injector 65. The locking means 66 is spring-pressed and comprises locking shoes which are forced out against the inner periphery of the cylindrical member, locking said member with respect to the fixed piston member.

Figure 4:
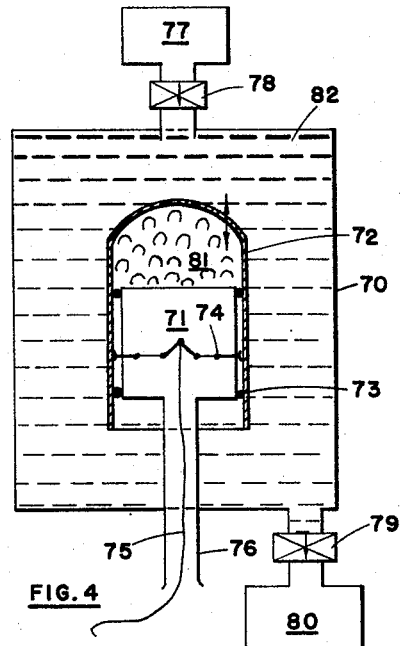
Fig. 4 shows a further modification of an ullage-compensating device.

Fig. 4 shows a still further modification of a means to effect the rapid pressurization of the liquid in a liquid-holding tank. In Fig. 4, the propellent tank 70 contains one or more propellent sections and has the ullage-compensating unit immersed therein. The ullage-compensating unit comprises a fixed piston 71 and a moving cylinder 72. Suitable sealing means 73 are provided. Freon, air, or other compressible medium fills the space 81 between the closed end of the moving cylinder and the surface of the fixed piston member 71. Expansion or contraction of the fluid within the tank 70 is compensated for by movement of the cylinder with respect to the fixed member. A manual means of locking the cylinder is provided in Fig. 4. The combination of a hand or mechanically operated lanyard 75 and locking means 74 will effectively lock the cylinder with respect to the fixed piston at any point in the resultant movement of the cylinder with respect to the piston member. The phrase "at any point in the resultant movement" means the relative position of the cylinder and the piston at a particular temperature after varying relative movement of said cylinder and said piston. The locking means is actuated prior to actuation of the pressurizing means 77 which bursts the diaphragm 78 and forces the liquid 82 within the tank 70 out through the burstible diaphragm 79 and into the injector and power plant 80. It can be seen that unlike the other modifications of this invention there is a possibility that changes in ambient temperature will take place between the locking and the actual pressurization. There then is the possibility that the pressurizing means 77 must first pressurize some ullage, but this problem is kept to a minimum by locking the cylinder just prior to the start of the firing cycle such as having the lanyard mechanically tripped at the instant of firing.

Figure 5:
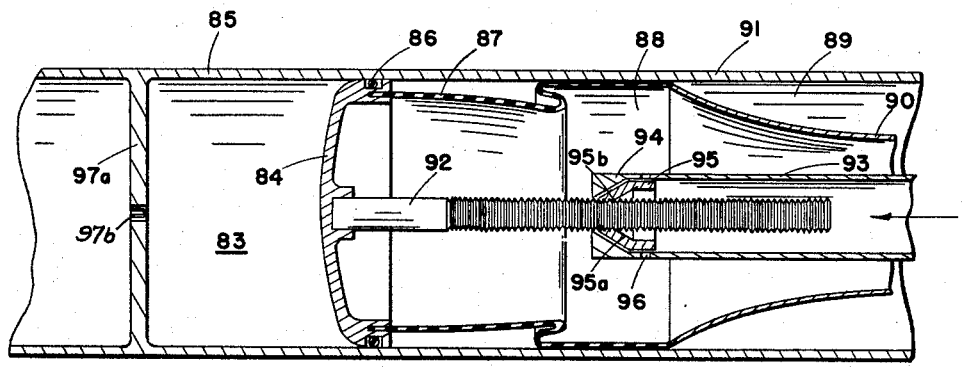
Fig. 5 shows an ullage-compensating device incorporating a particular locking means.

Fig. 5 shows a still further modification of an ullage-compensating unit with a particular locking means. In Fig. 5, the fixed member is in the form of an extension 85 of the exterior rigid wall of the propellent tank 91. There is provided a cylindrical or tubular member 84 having a closed end, said cylindrical member being slidable on the fixed member 85. It can be seen that in this modification the member 84 may take the shape of a solid cylinder or disc and may be of other than circular shape. Between the fixed member 85 and the sliding cylindrical member 84 there is provided a space 83 for reception of the compressible gas medium. A closure 97a provided with suitable filling ports 97b is also provided. A flexible sleeve 87 of plastic material is situated in sealing relationship between the base of the moving cylinder 84 and the inner periphery of the wall 91 of the propellent tank. Suitable sealing means 86 for the moving cylinder is also provided. The tank, as illustrated, contains a flexible wall portion 90 separating the propellent tank 91 into two propellent sections 88 and 89. Contraction and expansion of the volumes of propellants in the sections 88 and 89 are compensated for by movement of the moving cylinder 84 with respect to the fixed section 85. Freon, air, or other compressible medium is situated in the space 83 between the fixed member 85 and the movable member 84.

A particularly novel means of locking the cylinder with respect to the fixed member 85 is provided. This locking means comprises a stem portion 92 attached to the closed end of the cylinder 84, and a movable locking means associated with the end of the exhaust tube 93. This exhaust tube has an enlarged wedged-shaped portion 94 on the end thereof, and apertures 96 spaced from that enlargement. Insertable in a space between the extending rod 92 and the exhaust tube 93 is a moving collet 95 having a wedged-shaped surface 95a and a serrated surface 95b. Upon pressurization of the propellent tanks, the pressurizing medium flows along the exhaust tube in the direction of the arrow, forces the moving collet 95 into wedging relationship with the extension 94, and forces the serrated portions into locking engagement with the stem 92. When such collet is in locking position, the pressurizing means flows through the injector, and forces the flexible wall 90 against the rigid wall 91, thus forcing the propellant in propellent section 89 into the injector. Thus, in effect, the moving cylinder is locked with respect to the fixed member 85, simultaneously with the pressurization of the propellent tank.

Figure 6:
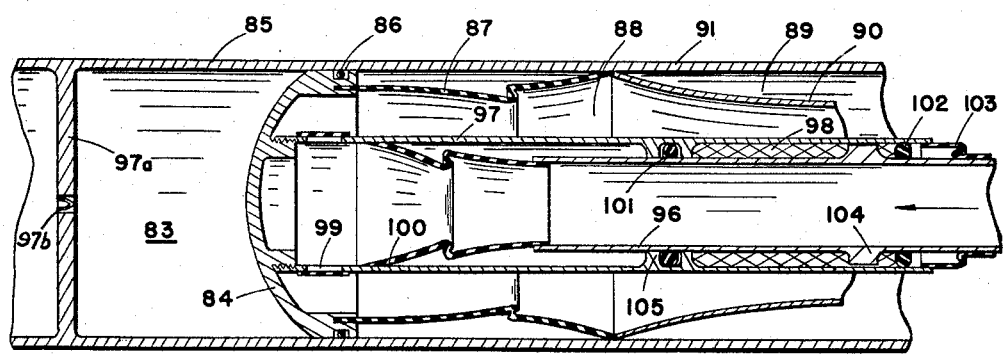
Fig. 6 shows another modification of an ullage-compensating device having a modified locking means.

Fig. 6 illustrates a still further means for effecting the rapid pressurization of a propellant in a propellent tank. The modification of Fig. 6 varies from the modification of Fig. 5 in that a different locking means is shown. The locking means shown in Fig. 6 basically comprises a tubular telescoping member 97 which is slidable on the end of the exhaust tube 96. Suitable sealing means 101 and 102, and sleeve sealing means 100 and 103 are provided. Embossments, or lands, 104 and 105 are provided on the exterior periphery of the exhaust tube and the inner periphery of the member 97, respectively. A silicone putty 98 is placed between the lands 104 and 105 and the sealing means 101 and 102. This modification makes use of the unique properties of silicone putty as a hydraulic fluid which becomes a solid on conditions of sudden loading. The putty is placed in the space between two O-rings 101 and 102 which slide on the exhaust tube 96 outside diameter. The land 104 on the exhaust tube performs a division of the putty, with the small clearance between the land and piston tube member 97 acting as an orifice. For the slow movements of the piston tube, required by propellent density changes, the putty will flow as a liquid. Thus, the moving cylinder 84 will move with respect to the fixed member 85 and compress the compressible medium within the space 83 between the moving and fixed members. The sleeve means 87, 100, and 103 allow for variable movement of the cylindrical member 84. When the tanks are to be pressurized, the pressurizing medium flows down the exhaust tube 96 in the direction of the arrow and flows through the apertures 99, after bursting associated burst diaphragms, to pressurize the propellent tank section 88 and the propellant tank section 89, the latter through the action of the flexible wall 90 being forced against the rigid wall 91. Simultaneously, upon the flow of the pressurizing medium in the exhaust tube 96, the putty 98 "solidifies" due to the sudden shock loading, thus effectively locking the cylindrical member 84 with respect to the fixed member 85. The solidifying silicone putty prevents any significant movement of the piston during the usual very short firing sequence of a rocket. Any hydraulic liquid or solid such as glass beads which offers hydraulic resistance to rapid flow may be employed in place of the putty.

Each of the above means for effecting the rapid pressurization of propellent tanks acts to isolate the inherent ullage present in the propellent tanks. Without these ullage compensation devices a cold generator, which is operating at a lower pressure to begin with, must pressurize a large ullage space to full tank operating pressure before normal operation of the rocket can begin. The result is a rocket which takes longer to start and, hence, takes longer to reach a specified target when cold than when hot. The instant invention, providing ullage compensating means, enables the pressurizing means to act directly on the propellants without first pressurizing the ullage space.

The above-explained ullage-compensating systems have been described in terms of their operation in a liquid propellent rocket engine. The use of such ullage-compensating systems is not limited to such liquid propellant rocket engine, but is generally applicable where there is a demand for a rapid rise in pressure to a predetermined level to force a steady supply of liquid from a supply container. The systems may be used to rapidly pressurize the fuel in a tank of a turbo-jet or a ram-jet engine system. Furthermore, these systems may be used to satisfactorily pressurize the liquids of a liquid-reactant gas generator system or power unit. The use of the herein-described means for rapid pressurization permits the containment, pressurization, and rapid delivery of many toxic, flammable, and corrosive liquids or semi-liquids.

A particular problem arises in sealing the ullage space, or compressible gas, from the various propellent sections. In the case of the modifications of Figs. 5 and 6, the flexible sleeves must be compatible with the medium with which they are in contact. Thus, if an acid oxidizer is to fill the space between the shell containing the movable cylinder and the flexible wall 90, the sleeve sections 87, 100, and 103 must be of acid-resistant material. When oxidizers are in contact with the sleeves, it has been found that such materials such as tetrafluorethylene (Teflon) or polytrifluorchloroethylene (Kel-F) are suitable. When typical fuels are to come in contact with the various seals these seals may be made of elastomeric materials such as Buna-N compounds.

All the metal parts, as well as the O ring seals, in the various modifications should be of materials that withstand any attack from the oxidizer or fuel.

It can be seen that incorporation of a relatively simple ullage-compensating system to a tank pressurization system enables the tank to be rapidly pressurized. Variations in rocket performance can be reduced to an extremely low level by the incorporation therein of the present invention. The instant variable ullage controller maintains zero ullage in the propellent containers at all temperatures and makes it unnecessary for the pressurizing means to pressurize any ullage volume whatsoever.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An ullage-compensating unit comprising a fixed member, a tubular member closed at one end and slidable on said fixed member, a compressible gas medium confined between said fixed member and the closed end of said tubular member, and means to lock said tubular member with respect to said fixed member at any position of said tubular member with respect to said fixed member.

2. A pressurizing system comprising a liquid-holding tank subjected to changes in ambient temperatures and an ullage-compensating means, said means comprising a fixed piston member within said tank, a cylinder having a closed end and being slidable on said fixed piston member, a compressible medium within said cylinder and being confined in a space between the closed end of the cylinder and the fixed piston member, whereby expansion or contraction of liquid in the tank due to temperature changes is compensated for by an equal contraction or expansion of the confined volume of compressible medium due to movement of said cylinder, means to effect rapid pressurization of liquid within the tank to expel the liquid from the tank, and means, responsive to said last-mentioned means, locking the cylinder with respect to the fixed piston member at a point on said cylinder dependent on the prior resultant movement of said cylinder.

3. A pressurizing system for effecting rapid flow of a fluid from a confining structure comprising a confined fluid, a fixed member, a tubular member having a closed end and being slidable on said fixed member, a compressible medium between the closed end of said tubular member and the fixed member, one of said members having a surface in communication with said confined fluid, changes in volume of said confined fluid being compensated by movement of said tubular member with respect to said fixed member, means to effect rapid pressurization of said confined fluid to expel said fluid from its confinement, and means to lock said tubular member with respect to said fixed member to prevent pressurization of said compressible medium when the confined fluid is rapidly pressurized.

4. The invention as set out in claim 3 in which the last-mentioned means includes a lock piston actuatable upon pressurization of the confined fluid.

5. The invention as set out in claim 3 in which the lock means is actuated prior to the pressurization of the confined fluid.

6. The invention as claimed in claim 3 in which the fixed member has a serrated portion extending toward said closed end and the last-mentioned means comprises a lock piston of wedge-shaped cross section which forces the serrated portion of said fixed member against the inner surface of said tubular member.

7. The invention as set out in claim 3 in which the pressurizing means includes an exhaust tube extending into the tubular member and in which the locking means comprises a locking member slidably mounted with respect to the exhaust tube and adapted to be locked upon actuation of said pressurizing means.

8. A pressurizing system comprising a fluid-containing closed container and means for isolating the ullage therein, said means comprising a fixed piston member within said container, a tubular member having a closed end and being slidable over said piston member, a compressible medium sealed within a space between the closed end of said tubular member and the piston member, a surface of said tubular member being in communication with the fluid in said container, expansion and contraction of the fluid within the container being compensated for by the movement of said tubular member with respect to said piston member contracting and expanding said medium, and means to lock said tubular member with respect to said piston member when the closed container is pressurized.

9. A pressurization system for a liquid-propellent rocket engine, said system comprising a propellent tank substantially completely filled with a liquid, a fixed cylindrical piston within said tank, an elongated cylinder having a closed end and being slidably mounted on said piston, and a compressible gas medium within the closed end of said cylinder, a surface of said cylinder being in communication with the liquid in the tank whereby expansion and contraction of said liquid is compensated for by an equal but reverse contraction and expansion of said gas medium.

10. The invention of claim 9 further comprising means to pressurize said tank to expel the liquid therefrom, and means to lock the cylinder with respect to the fixed piston.

11. The invention of claim 10 in which the pressurizing means actuates the locking means through a normally-closed valve operable at a pressure proximate to the pressure of said pressurizing means.

12. The invention of claim 10 in which actuation of said pressurizing means simultaneously pressurizes the propellent tank and locks the cylinder with respect to the fixed piston at a point dependent on the resultant contraction and expansion of said liquid and said medium.

13. A pressurization system for a liquid-propellent rocket engine, said system comprising a propellent tank substantially completely filled with a liquid, a fixed cylindrical member associated with said tank, a cylinder having a closed end and being slidably mounted on said fixed member, and a compressible gas medium between the closed end of said cylinder and the fixed member, a surface of said cylinder being in communication with the liquid in said tank, expansion and contraction of said liquid being compensated by an equal but reverse contraction and expansion of said gas medium, means to pressurize said tank to expel the liquid therefrom, and means to lock the cylinder with respect to the fixed member, whereby the pressurizing means acts directly on the tank liquid and whereby the tank ullage is isolated from the tank liquid.

References Cited in the file of this patent

UNITED STATES PATENTS

| | | |
|---|---|---|
| 1,036,043 | Westinghouse | Aug. 20, 1912 |
| 1,289,132 | Eaton | Dec. 31, 1918 |
| 1,314,413 | Martena | Aug. 26, 1919 |
| 2,056,076 | Le Blanc | Sept. 29, 1936 |